March 17, 1959 — A. M. CASABONA — 2,878,469
LANDING AND TRAFFIC CONTROL SYSTEM
Filed Oct. 30, 1953 — 10 Sheets-Sheet 1

INVENTOR
ANTHONY M. CASABONA
BY
Ernest Fanwick
ATTORNEY

March 17, 1959 A. M. CASABONA 2,878,469
LANDING AND TRAFFIC CONTROL SYSTEM
Filed Oct. 30, 1953 10 Sheets-Sheet 2

INVENTOR
ANTHONY M. CASABONA
BY
Ernest Fanwick
ATTORNEY

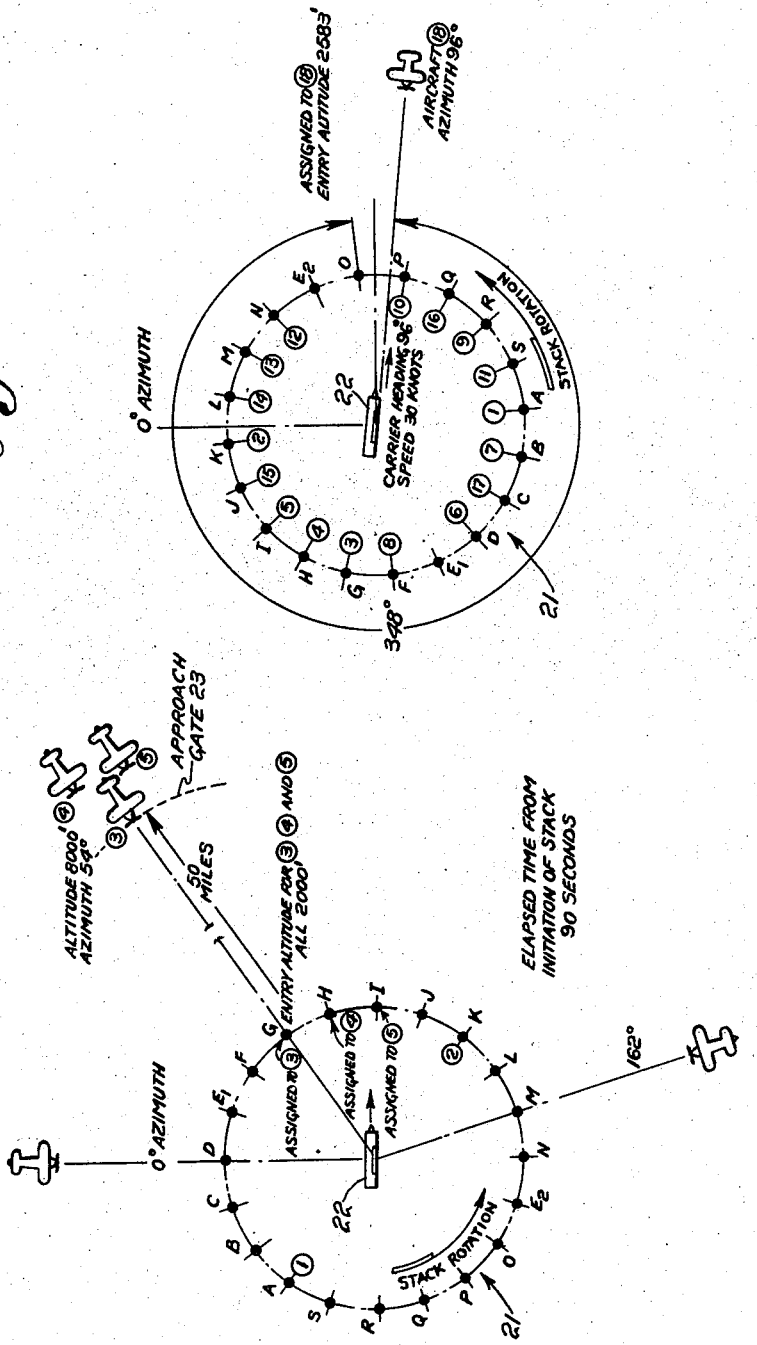

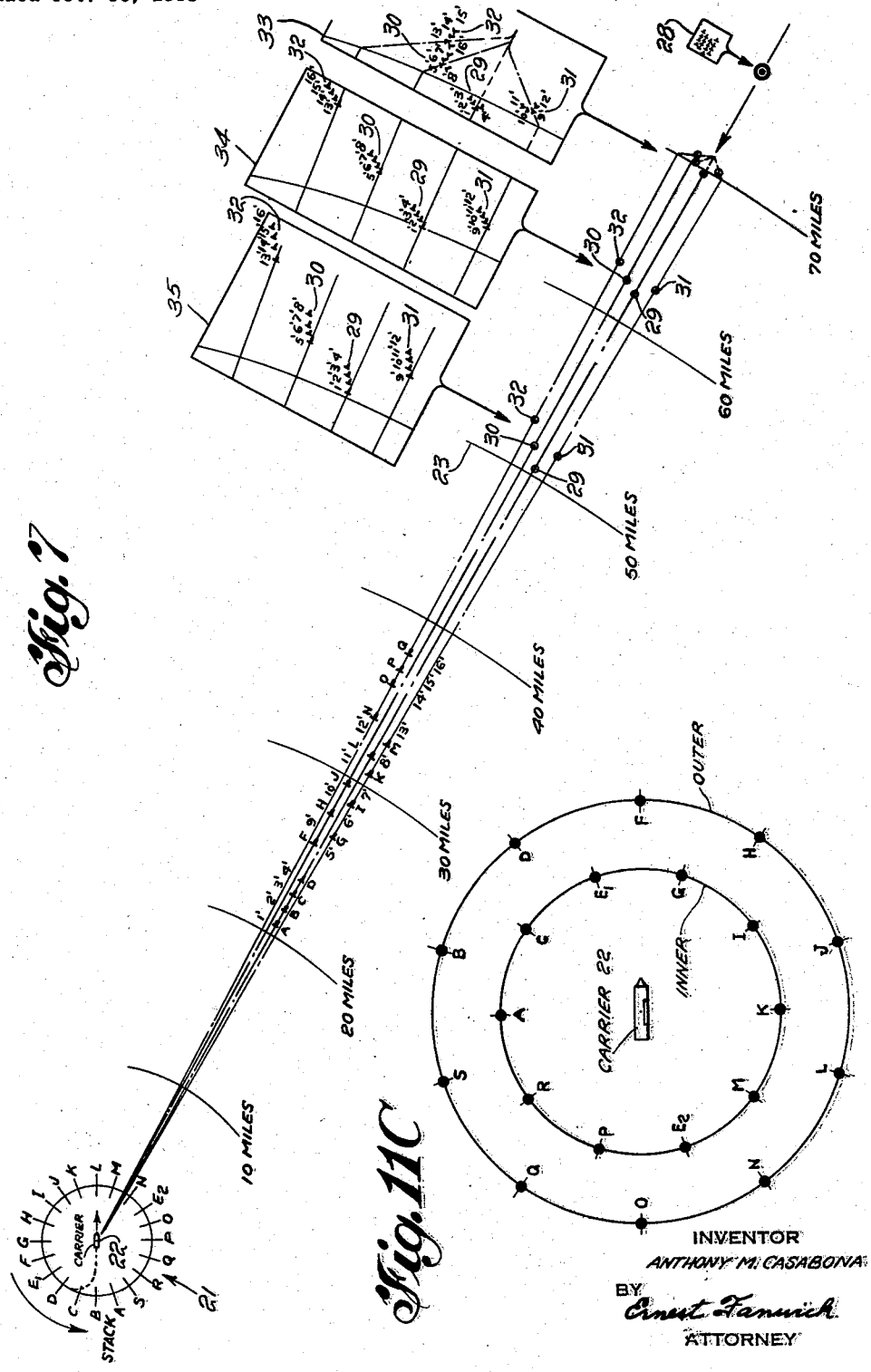

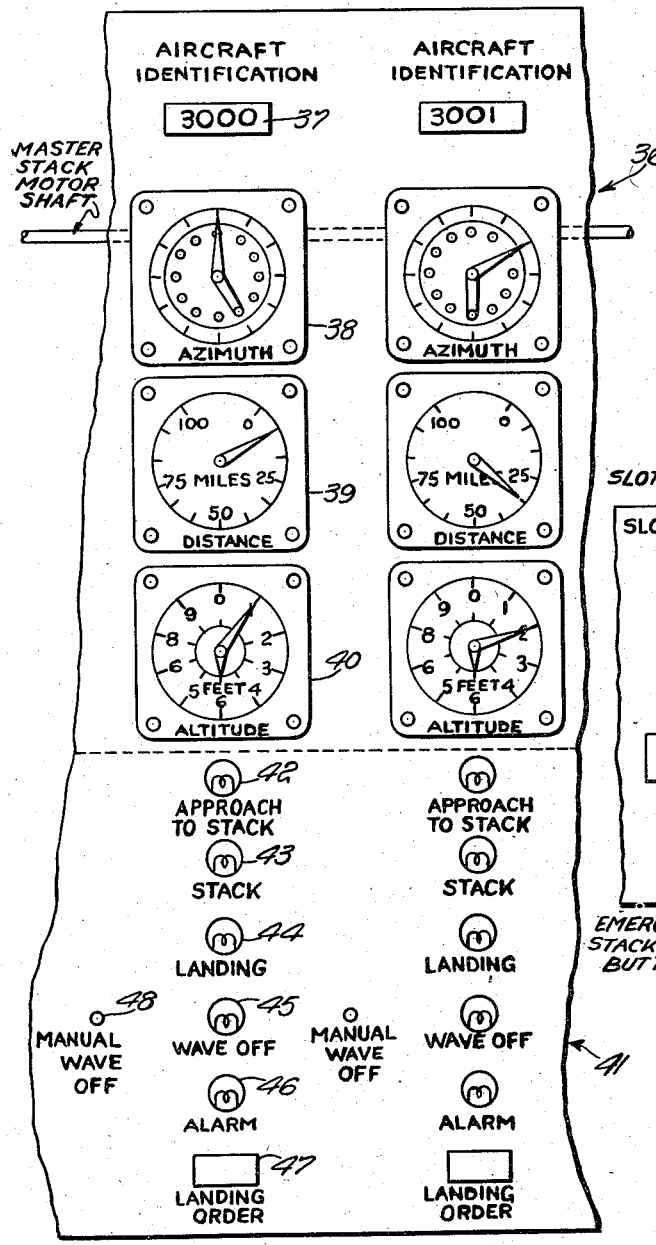
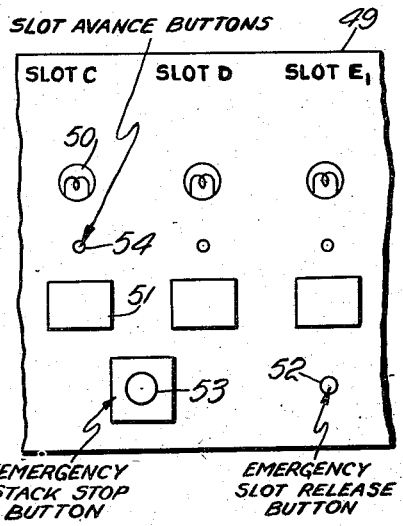

March 17, 1959 A. M. CASABONA 2,878,469
LANDING AND TRAFFIC CONTROL SYSTEM
Filed Oct. 30, 1953 10 Sheets-Sheet 6
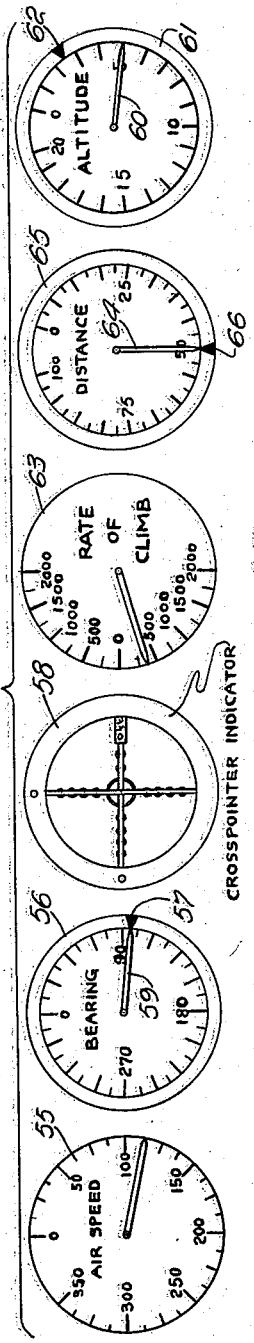
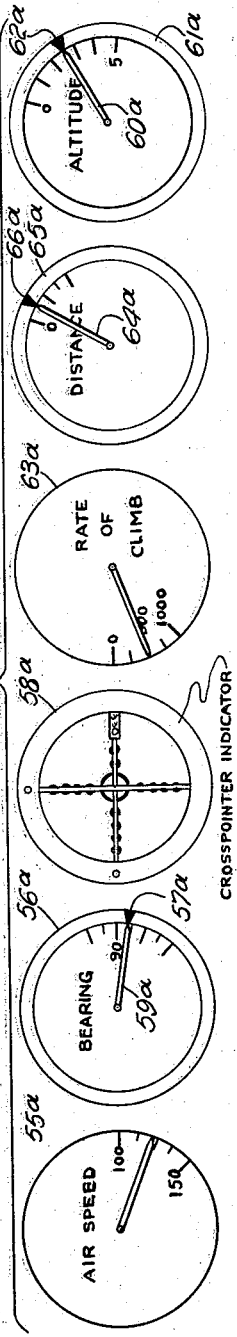
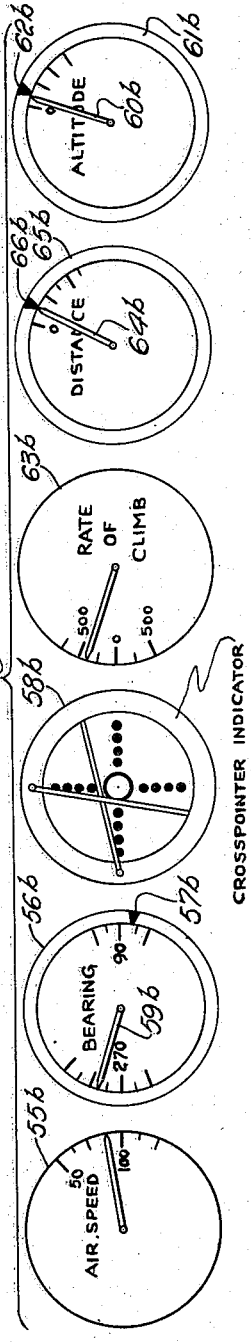
INVENTOR
ANTHONY M. CASABONA
BY
ATTORNEY

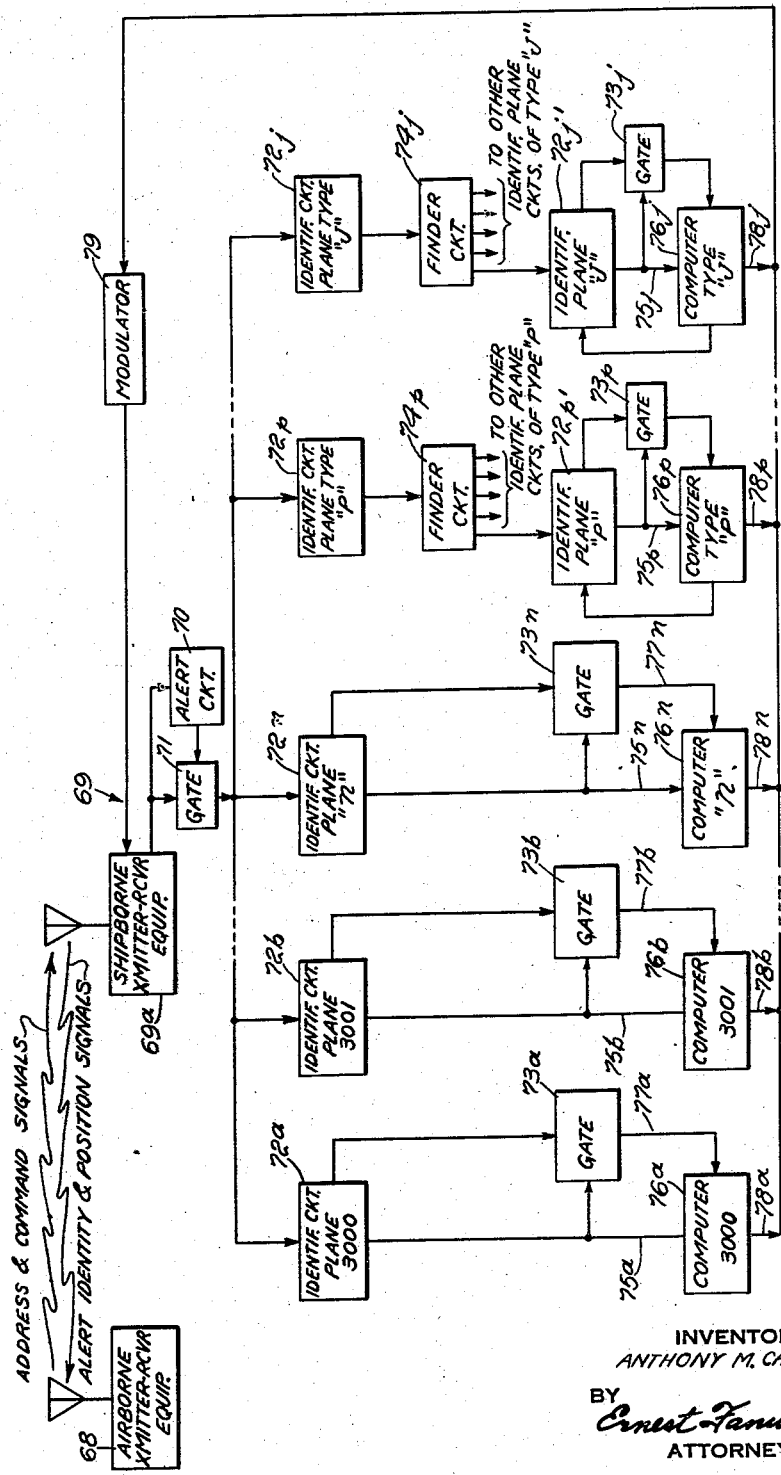

March 17, 1959   A. M. CASABONA   2,878,469
LANDING AND TRAFFIC CONTROL SYSTEM
Filed Oct. 30, 1953   10 Sheets-Sheet 8
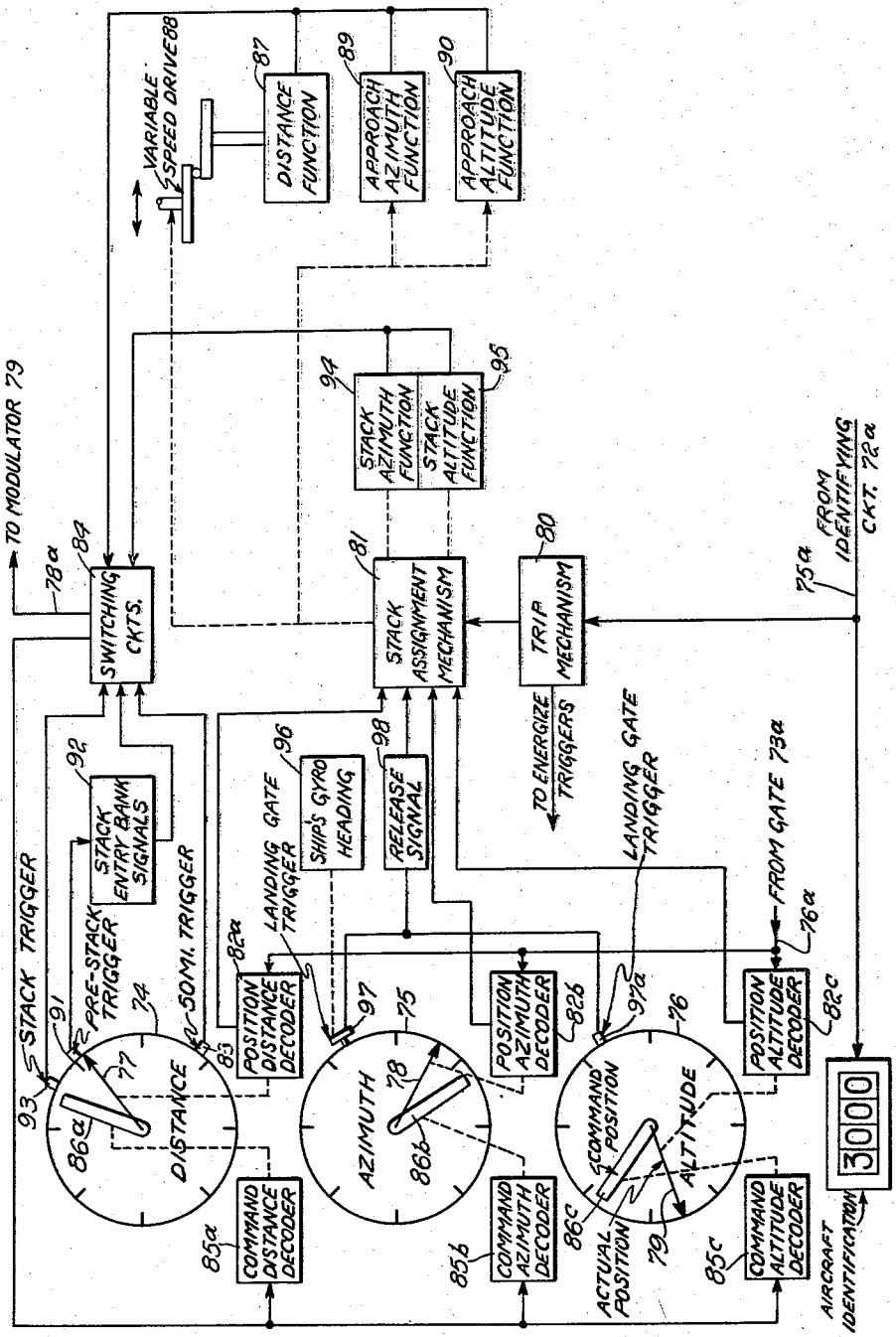

March 17, 1959 A. M. CASABONA 2,878,469
LANDING AND TRAFFIC CONTROL SYSTEM
Filed Oct. 30, 1953 10 Sheets-Sheet 9
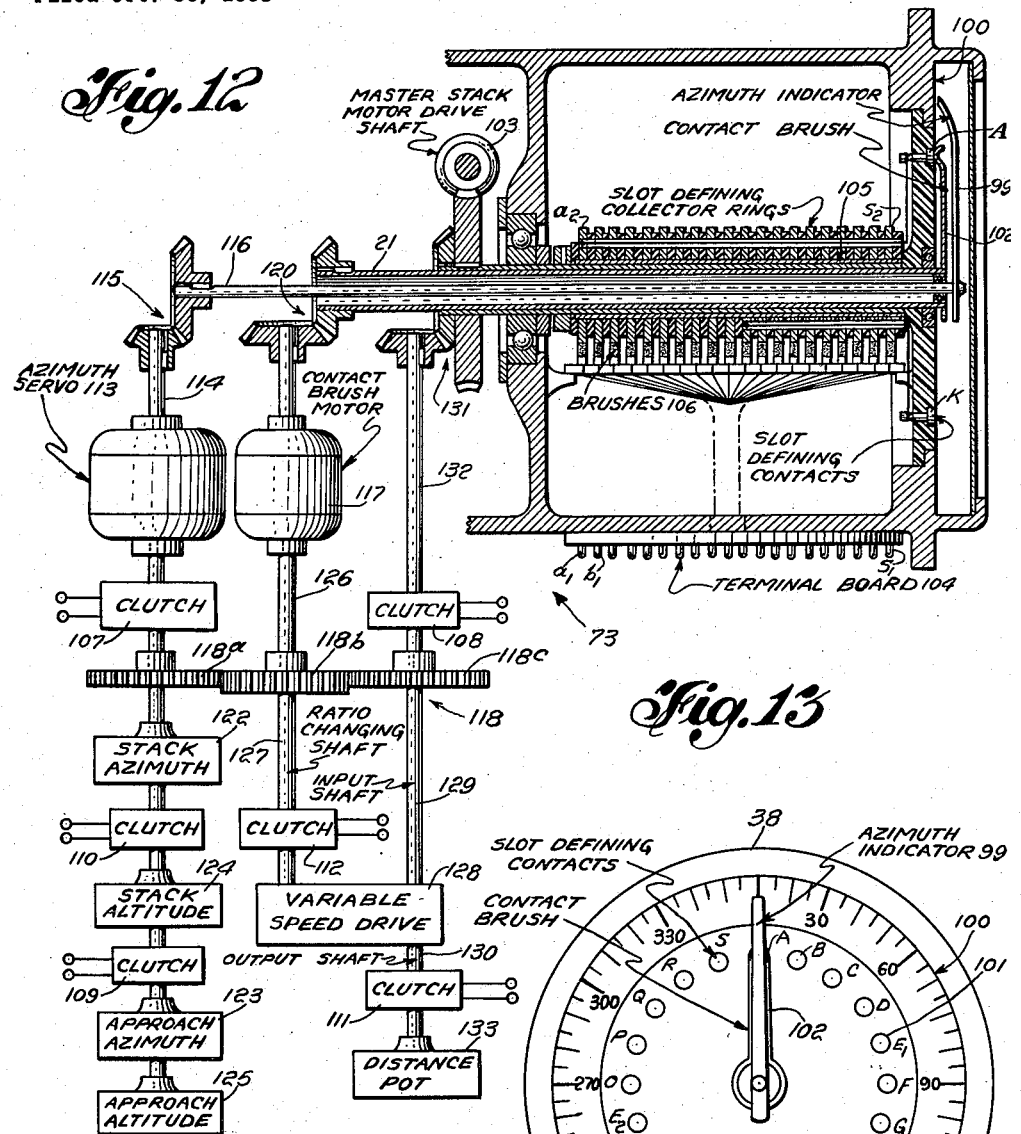
Fig.12
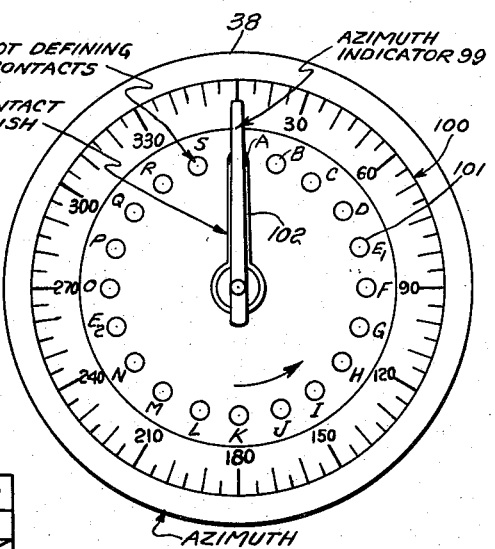
Fig.13
Fig.13A
| CLUTCH CONDITION | 107 | 108 | 109 | 110 | 111 | 112 |
|---|---|---|---|---|---|---|
| ALERT | X | | X | X | | |
| AT 50 MILE GATE | | | | X | X | |
| AFTER ASSIGNMENT | | X | | X | X | X |
| STACK GATE | | X | X | | | |
| STACK STOP | | X | | | | |
X = ENGAGED POSITION
INVENTOR
ANTHONY M. CASABONA
BY
Ernest Tamwick
ATTORNEY March 17, 1959 — A. M. CASABONA — 2,878,469
LANDING AND TRAFFIC CONTROL SYSTEM
Filed Oct. 30, 1953

INVENTOR
ANTHONY M. CASABONA
BY
Ernest Fanwick
ATTORNEY

United States Patent Office 2,878,469
Patented Mar. 17, 1959

2,878,469

LANDING AND TRAFFIC CONTROL SYSTEM

Anthony M. Casabona, North White Plains, N. Y., assignor to International Telephone and Telegraph Corporation, Nutley, N. J., a corporation of Maryland Application October 30, 1953, Serial No. 389,194

15 Claims. (Cl. 343—112)

This invention relates to a landing and traffic control system for aircraft and more particularly to a landing system and integrated traffic control system providing for the orderly radio aided landing of a large number of aircraft simultaneously approaching a given landing strip.

It is appreciated by all authorities on aircraft operations that a well organized traffic control system is a necessity for the proper and efficient utilization of any radio aid landing system. At present when a large number of aircraft approach a landing field it is necessary to delay the arrival of the planes so that the radio aids are not saturated beyond their capacity. This delay causes the planes to circle around the landing strip or some designated rendezvous point. In bad weather when the capacity of any landing system is reduced the number of planes that can be landed in any given time is greatly decreased and the additional delay in landing causes the planes to stack up while awaiting their turn to utilize the landing facilities. This stack time is very costly and causes great inconvenience to air travellers. Any system which reduces stack time would be greatly appreciated by the air transport industry. In addition to the time delay, present-day procedure requires that the airport control tower or landing control personnel radio verbal instructions regarding the stack location and the location of the individual plane within the stack to the pilot. The pilot must then conform to these verbal instructions. In the interest of safety it is desirable to avoid verbal instructions, and this is particularly true in areas of great traffic density such as occur when air traffic utilizing a landing strip must be stacked.

Perhaps the ultimate problem posed for a landing and traffic control system is present aboard an aircraft carrier when its planes return from a mission and desire to land. The number of aircraft approaching the carrier in such a situation may be approximately a hundred or more. At present all carrier aircraft perform the function of homing to the carrier or to a rendezvous point before considering landing procedure. This results in the concentration of traffic in some small area with its associated danger of collision. It is readily understandable that information about a hundred aircraft is not comprehensible to one individual in the short time necessary for him to make the arrangements for landing nor can a group of individuals assigned to certain sectors rapidly arrange the traffic among themselves in the best possible manner in the short time required.

It is an object of this invention, therefore, to provide a landing and traffic control system for aircraft which is automatic in its operation and capable of controlling a large number of aircraft.

It is another object of this invention to provide an automatic computer to control the approach of a large number of aircraft to a landing strip equipped with radio aids for landing.

A further object of this invention is to provide an automatic traffic control system to allow for the speedy and efficient landing of a large number of airplanes with a minimum amount of human supervision.

A feature of this invention providing for the landing of a large number of aircraft in a minimum of time is the traffic control provision whereby the planes approach the landing area in an orderly sequence rather than in groups. A computer issues commands to the individual aircraft to fly a course in order to arrive at the landing site in the optimum sequence. The traffic control and landing operation is controlled through the use of a stack synchronized with a regular landing interval. Individual aircraft are controlled from an approach gate at some distance from the landing strip such that they each approach a previously assigned position in the synchronized stack. The aircraft orbits in the synchronized stack until it intercepts a landing gate at which time it receives the radio aid landing information to guide it on its final approach leg.

The above-mentioned and other features and objects of this invention will become more apparent by reference to the following description taken in conjunction with the accompanying drawings, in which:

Fig. 3 is a schematic diagram of the initiation of the landing stack configuration at a given instant of time.

Fig. 6 is a schematic illustration of a landing stack configuration of this invention being utilized by eighteen aircraft;

Fig. 7 is a schematic illustration of a standard break-up procedure for a large formation of aircraft approaching the stack configuration of Fig. 2;

Fig. 8 is a front elevation of a portion of the information panel and monitor board;

Fig. 9 is a front elevation of a portion of the emergency board;

Figs. 10A, 10B and 10C are illustrations of an aircraft's instrument panel as the aircraft is located in various positions relative to the synchronized stack;

Fig. 11A is a simplified schematic diagram in block form of a communication system for use with the traffic control system of this invention;

Fig. 11B is a simplified schematic diagram in block form of a traffic control stack computer;

Fig. 11C is a schematic illustration of an alternate stack configuration for use by two types of planes having different flight characteristics;

Fig. 12 is a schematic illustration partly in section of the stack assignment mechanism for use in the traffic control computer;

Fig. 13 is a front elevational view of the azimuth meter associated with the mechanism for use in the traffic control computer;

Fig. 13A is a graphical illustration explaining the operation of the clutches shown in Fig. 12;

Although this invention is described for use with a ship-borne landing system it should be understood that its application is not limited to use with an aircraft carrier, but that it can be utilized in conjunction with any shore base airport or landing strip.

Figure 1:
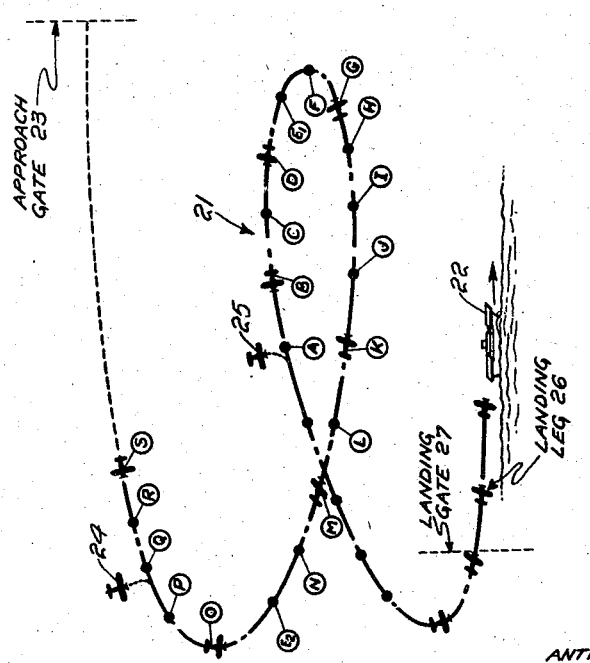
Fig. 1 is a schematic illustration of the landing stack configuration centered about an aircraft carrier.

The landing and traffic control system of this invention is based upon an airplane landing stack configuration synchronized with a regular landing interval although it can be readily appreciated that the traffic control system is adaptable to any predetermined flight path configuration. Referring to Fig. 1, it is seen that this stack 21 consists of a spiral pattern centered about an aircraft carrier 22 and synchronized with a predetermined regular landing interval. As described hereinafter, aircraft are controlled from an approach gate 23 at some distance from the carrier such that they reach a previously assigned position in the synchronized stack 21 as shown by airplane 24 approaching stack position Q or airplane 25 approaching stack position A. Each aircraft in the stack has a common rate of descent of 500 feet per minute. In addition, the aircraft are spaced on the periphery of the helix or stack such that a 30-second interval exists between aircraft. One stack arrangement may have a helix radius of approximately 3.2 nautical miles and, therefore, for a 30-second landing interval, and a flying speed of 120 knots, the horizontal distance between aircraft will be one nautical mile. For a rate of descent of 500 feet per minute the vertical separation between the aircraft will be 250 feet. All aircraft in the traffic pattern continuously receive navigational information which insures their correct position. This information, in addition to being displayed in the cockpit of the aircraft, can be used to actuate the automatic pilot to produce varying rates of speed, turns to the right or to the left, or changes in the rate of descent.

The aircraft are admitted to the synchronized stack in the following manner. Assuming the aircraft in the stack are flying at a speed of 120 knots and the stack has a radius of 3.2 miles, the aircraft makes a complete turn about the carrier 22 every 10 minutes. Any aircraft desiring to enter this stack pattern alerts the equipment on the ship when it enters the approach gate 23 which is at a distance of approximately 50 miles. A computer hereinafter described prescribes the course and speed for the aircraft requesting entry into the stack 21 in such a manner that the aircraft will arrive at a previously assigned spot in the helix without any danger of collision. Obviously any spot in the helix can be filled at a chosen time if the speed of the aircraft is controlled. The range of speed control necessary for the assumed stack configuration is such that the flying time from the gate 23 to the stack 21 becomes a minimum of 10 minutes, the time necessary for one stack position to make a complete rotation about the carrier 22, or a maximum of almost 20 minutes, the time necessary for a stack position to make 2 revolutions about the carrier 22, from the 50 mile approach gate 23 to the helix or stack 21. If we assume that an aircraft is capable of speeds up to 310 knots and has a stalling velocity of not more than 80 knots and if such an aircraft must cover the approach distance from the gate 23 to the helix 21 in 10 minutes, which would indicate that the nearest stack position has been assigned to it, it will approach the carrier 22 at a rate of 280 knots. At the other extreme, where an airplane must cover the distance from the approach gate 23 to the helix 21 in 20 minutes the aircraft has an average closure rate of 140 knots. These velocities are, of course, relative to the carrier 22, and therefore an additional margin of speed must be allowed. Assuming the carrier velocity, or the combination of wind and the carrier velocity, to be 30 knots, the range of velocities that the airplanes utilizing this landing system must be capable of obtaining varies from 310 knots at a maximum to a minimum of 110 knots. These speeds, under the assumed conditions, are well within the capabilities of present-day aircraft. It is of course realized that the velocities mentioned above are taken merely as examples and can be modified as required to fit actual operating conditions. As hereinafter explained all of the above control signals, commands and information are produced automatically and are not in any way determined manually.

Of course, it must be realized that aircraft will not necessarily occupy the complete periphery of the stack 21. Each aircraft will fly just that portion of the helix necessary for it to get aft of the ship at which point the landing leg 26 is entered. In a normal landing operation, all aircraft will normally approach the carrier 22 from the same direction because of the necessity for proper identification by flight over an outlying destroyer. Assuming that this direction of approach is over the bow the aircraft proceed in the helix around the port side to the stern and then enter the landing leg 26. Hence for this approach direction, aircraft would never physically occupy the stack on the starboard side even though all the positions or slots are assigned. Thus, if only a portion of the helix shown in Fig. 1 is utilized as explained above, it is possible that the arrangement of carriers in a fleet can be managed such that the stacks of adjacent carriers are non-interfering and so that certain lanes could be kept clear of traffic.

Based on the assumption that the landing traffic is organized as described above, an individual aircraft arriving by a prescribed route in the vicinity of the aircraft carrier requires the cooperation of two systems on board the carrier for complete navigation, traffic control and landing. The first system must bring the aircraft from 100 or more miles into the vicinity of the carrier 22 and feed the aircraft into the synchronized stack 21. The aircraft then orbits in the synchronized stack 21 until it intercepts the landing gate. At this point of transition the navigational signals of the first system cease and the aircraft must receive the landing signals necessary to complete the landing of the airplane. The signals necessary from each system may be automatically switched when the aircraft intercepts the landing gate 27. The second system or landing equipment must provide the aircraft with localizer, localizer heading, glide slope and DME (distance measuring equipment) information necessary to guide it on the landing leg 26. The complete path including the synchronized orbiting will therefore be flown in a pattern similar to the standard curved approach now used with manual operations.

For purposes of illustration, hypothetical landing problems are hereinafter illustrated and the action of the signals on the aircraft control is described. The stack configuration and various assumed parameters such as aircraft speed, stack radius, allowable separations and rates of descent, may be revised as necessitated by actual operational requirements and the illustrations are provided merely to explain the proposed principle of operation only, the versatility of this invention allowing a wide latitude in the choice of parameters.

Figure 2:
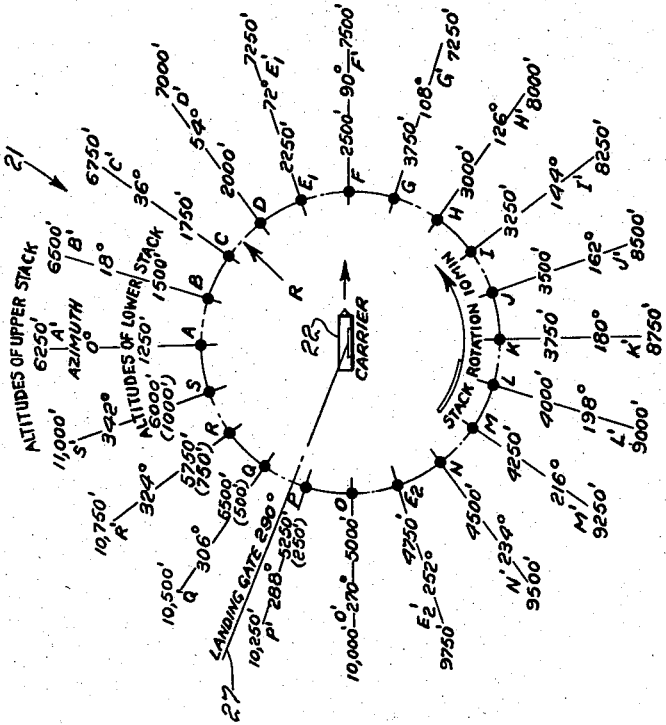
Fig. 2 is a schematic diagram of the landing stack configuration of this invention.

Referring to Fig. 2, a plan view of a synchronized stack 21 at a particular instant of time is illustrated. The hypothetical slots or aircraft positions waiting to receive aircraft are lettered A through S with slots $E_1$ and $E_2$ designated as "emergency" slots. The emergency slots are not filled during normal operation but are reserved for aircraft in trouble, thereby eliminating to a large extent the necessity for ever "stopping" the stack with its associated loss of time or of delaying the landing of emergency aircraft.

It is assumed that the stack rotates at the rate of one revolution every 10 minutes and has a radius of 3.2 nautical miles, thus corresponding to a time of 30 seconds between slots. The instantaneous altitudes of each slot are shown in Fig. 2. Thirty seconds after the instant illustrated in Fig. 2, for example, slot A would be at an altitude of 1000 feet; slot B at 1250 feet, etc., thereby the helical path of the stack has a rate of descent of 500 feet a minute. It should be noted that slots P through S have two altitudes noted for them. The higher altitude is termed the entry altitude for the slot. For instance, an aircraft requesting entry from an azimuth of 306° would be commanded to enter at 5500 feet and fly slightly more than one complete revolution in the stack before entering the landing gate at approximately 250 feet at an azimuth of 290°. If the airplane was allowed to enter at the 500 foot altitude, the time in the stack would be less than 30 seconds, which may be insufficient for good synchronization. Thus, the shortest time allowed in the assumed stack configuration of Fig. 2 corresponds to entry into slot A from 0° azimuth and is about 2 minutes in length. The radius of the stack is determined by the desired average speed of the aircraft in the stack, and as we assume the desired average speed of the aircraft to be 120 knots, the radius of the stack is set at 3.2 nautical miles. It is obvious that one revolution of a full stack would contain 20 aircraft (including two emergencies) around its periphery and that the aircraft are separated in altitude by 250 feet and in horizontal distance by one mile.

In a similar manner a second revolution of the stack can be formed above the first one and in synchronism with it. A second slot A' in the same azimuthal direction as A, but at an altitude of 6250 feet can be created. Slots A' through S' progress, as in the first stack, to an altitude of 11,000 feet. Thus, an additional 20 airplanes can be admitted to the upper stack and progress smoothly down two turns of the helix to the landing gate 27. Of course, this upper stack is utilized only when saturation conditions exist, that is, when aircraft request landing clearance at less than the 30-second average intervals. Normally, the lower stack releases an empty slot every 30 seconds and the upper stack is not utilized if landing request intervals average not less than 30 seconds.

Assuming for purposes of explanation that a large group of aircraft are returning to the carrier, the following describes the assignment of stack positions to the individual aircraft. It is assumed for purposes of explanation that the aircraft are receiving DME and omni-range information and are telemetering back to the carrier their positions in distance, azimuth, elevation and their identifications. In addition, it is assumed that the aircraft receive telemetered "commands" in distance, azimuth and elevation causing the autopilots to direct the aircraft to the commanded location. Aircraft may be assumed to arrive singly or in groups, at random times and from many directions. Although this type of operation is seldom encountered on aircraft carriers, it is likely to occur at shore bases for which purposes the equipment is equally suited.

A gate 23 is established at 50 nautical miles from the carrier at which point the automatic control commences. Prior to the first airplane requesting permission to land, the synchronized stack is quiescent, that is, the exact position of the slots is not yet determined.

Referring to Fig. 3, assume that aircraft 1 has reached the approach gate 50 nautical miles from the carrier 22, at an altitude of 5,000 feet and at an azimuth of 0°, having previously requested or having been commanded to land. Up to this point the aircraft 1 has been homing on the carrier 22 either manually or automatically with equipment well-known to those skilled in the art. The telemetered signal on the carrier 22 received from the aircraft 1, indicating that the first aircraft has reached the 50-mile approach gate, puts the stack computer into operation as hereinafter described, and establishes the stack as shown in Fig. 2. Essentially aircraft 1 is given a slot straight ahead, after which the stack rotation is started.

Assuming that the described speed of the aircraft in the stack is 120 knots, the radius of the stack is 3.2 nautical miles and the time for a complete rotation of the stack is 10 minutes, the aircraft 1 must be made to fly from its present position at the approach gate 23 to the stack 21 at 3.2 nautical miles from the carrier 22 in exactly 10 minutes if he is assigned slot A, and slot A makes one complete revolution in 10 minutes. Therefore, the aircraft 1 is commanded by signals from the ship to cover 46.8 nautical miles in 10 minutes. The aircraft's throttle and possibly flaps may be controlled to adjust his speed as determined by the command signals when compared with his own distance measuring equipment. In addition, his azimuth must be constant at 0°, which enables him to maintain homing from that direction. His decrease in altitude must move at some maximum required rate to reduce his altitude from 5,000 feet at 50 nautical miles to the 1250 feet which is his assigned entry altitude at 3.2 nautical miles from the carrier 22. It is not necessary to allow for wind or movement of the carrier, since the signals originate from the carrier and are, therefore, relative to it. Essentially, the movement of the carrier 22 is being continuously and automatically represented in the telemetered command signal and the aircraft 1 makes continual corrections in his rate of closure in order to reach the designated point at the prescribed time.

Figure 4:
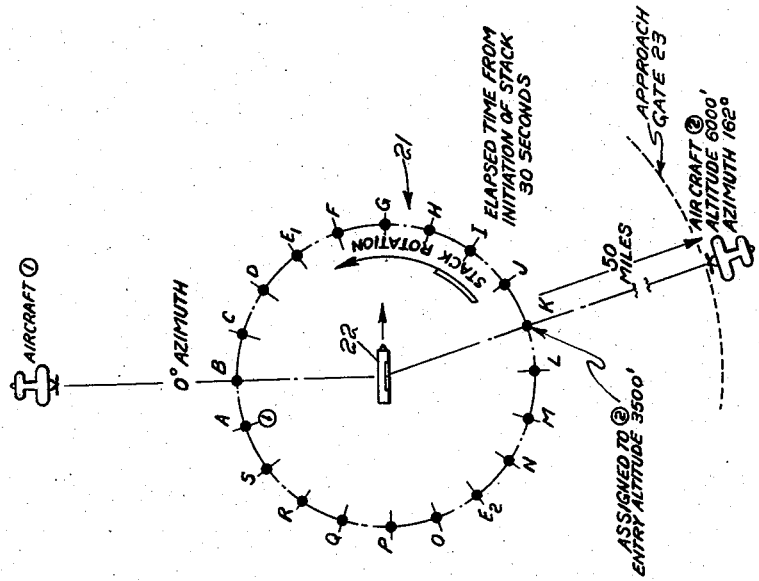
Figs. 4 and 5 are schematic illustrations of the landing stack of Fig. 3 thirty seconds and ninety seconds later respectively.

Let us assume that 30 seconds after aircraft 1 establishes the stack 21, aircraft 2 reaches the 50-mile approach gate at an azimuth of 162° and at an altitude of 6,000 feet as shown in Fig. 4. Since 30 seconds have elapsed since the initiation of the stack 21 the slot positions in the stack have rotated the equivalent of one slot in 30 seconds. Aircraft 2 is assigned slot K and is given the same "distance-time" function as aircraft 1, that is, 46.8 nautical miles in 10 minutes. However, aircraft 2 is commanded to maintain a homing azimuth of 162° and to descend from its present 6,000-foot altitude to the 3,500-foot entry altitude for slot K of the stack.

Figure 5:
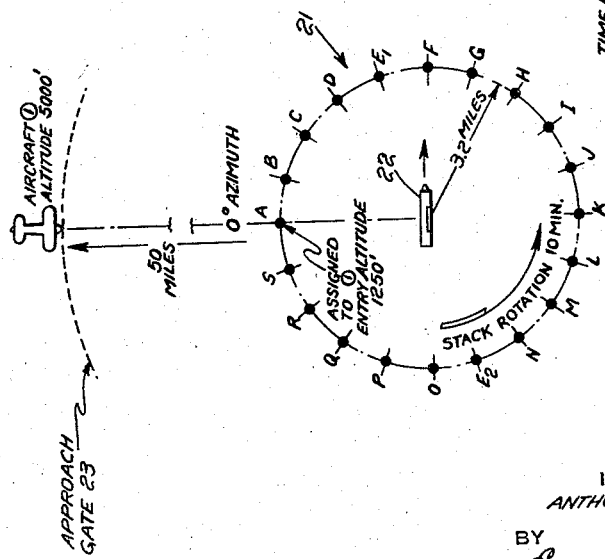

Assuming that one minute after aircraft 2 requests landing instructions and 1½ minutes after aircraft 1 initiated the stack 21 a group of three aircraft 3, 4 and 5 in close formation reach the 50-mile approach gate 2 at an azimuth of 54° and at an altitude of 8000 feet, as shown in Fig. 5. The requests for a slot in the synchronized stack 21 from the three aircraft 3, 4 and 5 are received at very close intervals and a guard circuit on the computer as hereinafter described prevents two aircraft, even if calling simultaneously, from being assigned the same slot. The proper assignment for each aircraft in the group is made almost instantaneously so that negligible time elapses before each aircraft gets landing instructions. In the case of larger close formations a break-up procedure is suggested before intercepting the 50-mile gate and this procedure is hereinafter described. The first of the group of three aircraft, aircraft 3, is assigned slot G, given a 10-minute elapse time to enter the stack as described for aircraft 1 and aircraft 2, and aircraft 3 is commanded to descend to 2,000 feet which is the entry altitude for slot G. For the second plane of the group, aircraft 4, the computer searches for the next available slot in a clockwise direction and would therefore assign slot H. This elapsed time, however, must be 10 minutes and 30 seconds so that slot H will be at azimuth 54° when aircraft 4 approaches the stack, and this necessitates that aircraft 4 move at a slower rate than aircraft 3 so that the 46.8 miles be covered in 10 minutes and 30 seconds. Aircraft 4 is also commanded to descend 2,000 feet since slot H will be at that altitude when it is intercepted at an azimuth of 54°. The last aircraft of the group, aircraft 5, is assigned slot I and its elapsed time from the approach gate 23 to the stack 21 must be 11 minutes. Hence, it will be the slowest moving aircraft relative to the carrier 22 since aircraft 5 must cover the 46.8 miles in 11 minutes. Aircraft 5 will also be asked to intercept the stack at 2,000 feet since that will be the altitude of slot I at 54° azimuth. When these commands are received aboard the aircraft in the group, the three aircraft in close formation begin to pull away from each other until they assume the 30-second intervals between them as dictated by the command signals.

In this manner, the stack 21 keeps accepting aircraft to a maximum of 18 per stack, refusing entry to emergency slots $E_1$ and $E_2$. It should be pointed out that any aircraft in trouble can be given the first available slot, not necessarily $E_1$ or $E_2$, if it requests landing permission at any time when the stack is not filled. Therefore, it is quite possible that the 18 aircraft mentioned above already contain some "emergencies" which have been handled in the most expeditious manner. They are being brought in for a landing in the best possible time, as is every other aircraft within the limits of the system and without disturbing normal traffic flow. Using two stacks, 40 aircraft can be accommodated, including four emergencies, with a slot released for an additional aircraft every 30 seconds. If the system is required to handle more than this number of aircraft at a given time or at a greater rate, it is possible to direct the overflow traffic into concentric orbits at the highest altitude of the stack, forming a "mushroom" traffic pattern. As slots are released and reappear at the top of the stack the "mushrooming" aircraft already at the correct altitude are cleared into successive inner orbits and finally enter the stack at 30-second intervals.

For purposes of the above explanation convenient intervals of time and azimuth were chosen and it should be, of course, understood that the system operates with any intermediate combination of time or azimuth. For example, consider the situation illustrated in Fig. 6 wherein the stack is filled with airplanes 1 through 17 with the exception of slot O and the emergency slots $E_1$ and $E_2$. At the time aircraft 18 requests landing permission the slots may be assumed to be in the intermediate positions shown, and aircraft 18 is assumed to be at an azimuth of 96° when it enters the 50-mile approach gate 23. In searching for an open spot clockwise the computer traverses 348° before it locates empty slot O. The amount of elapsed time, therefore, to the stack for airplane 18 is $$10 + \frac{348}{360} \times 10 = 19.67 \text{ minutes}$$

Neglecting wind or the motion of the carrier, the average speed of the aircraft would be such as to cover 46.8 miles in 19.67 minutes or 142.8 knots. In reality the 142.8 knots represents the rate of closure between the carrier 21 and the aircraft 18 and this is the rate at which the airplane must be commanded to fly. Assume the carrier to be steaming at a heading of 96° such as to maintain a 30-knot wind across its landing deck. Then the actual indicated landing speed of aircraft 18 would be 112.8 knots. The assigned entry altitude for 96° azimuth would be $$2500 + \frac{250}{3} = 2583 \text{ feet}$$

In computing the maximum speed that an aircraft would ever be requested to fly let us consider the first aircraft which is always requested to cover the distance in the minimum time, namely, 10 minutes. His rate of closure is, therefore, 46.8 miles in 10 minutes or 281 knots. Assume the carrier to be steaming directly away from the aircraft at an equivalent of 30 knots and then the indicated air speed would be 311 knots and represents the maximum required speed of any aircraft under the above assumed conditions.

The foregoing examples include the assignment into the stack of aircraft arriving singly or in small groups from various azimuths and at different times. Any practical equipment must be capable of handling a large group of aircraft arriving in a tight formation. Since the DME accuracy of known equipment is of the order of ±1000 feet, as far as the computer is concerned, all aircraft in a close flight appear to be at the same point. The computer would then proceed to assign a slot to each aircraft, but at random, thereby allowing the possibility of an aircraft in the rear of the squadron being assigned an "early" slot. This would mean that the aircraft would have to overtake and pass members of the squadron in front of him with the subsequent danger of collision. It is preferable therefore that large formations break up before intercepting the 50-mile approach gate 23 so that the aircraft enter the gate individually, either at slightly different azimuths or with at least a 1,000-foot spacing between aircraft or both. In the event of foul weather, dispersion may have already been ordered by the group leader, but in any case, it is desirable that a standard break-up procedure be adopted before interception of the 50-mile gate so that the most efficient utilization of the equipment of this invention can be realized. As hereinafter shown, this break-up procedure does not result in a delay, but rather is most efficient in its use of time.

Consider a formation of 16 aircraft 28 returning to the carrier as shown in Fig. 7. From 60 to 70 miles from the carrier the group leader orders a standard break-up procedure. The first group or lead flight 29 of four aircraft 1' through 4' continues on course. The second group 30 of four aircraft 5' through 8' turns 30° to the right and after 30 seconds resumes the original heading while the third group 31 of four aircraft 9' through 12' performs the same maneuver to the left. Finally the fourth group 32 of aircraft 13' through 16' would turn 60° to the right and after one minute resume the original heading. This maneuver is shown in the enlarged insert 33 of Fig. 7.

Once each group is clear, the group leader calls for an echelon to the right formation, and the aircraft rearrange themselves as shown in the enlarged insert 34 at 60 miles. Individual aircraft then begin to pull away from the aircraft in front until at least 1,000 and preferably 2,000 feet distance exist between members of the flight as shown in the enlarged insert 35 at 50 miles. At 50 miles the computer aboard the aircraft carrier 22 begins to make stack assignments and because of the distribution both in distance and azimuth, no conflicting assignments can be made by the computer.

The group 28 is shown beyond the 50-mile gate after the assignments have been made, and the aircraft 1' through 16' have assumed their positions. The lead flight 29 has been assigned slots A through D. Since the second and third flights 30 and 31 performed symmetrical maneuvers, it can be assumed that they intercepted the 50-mile approach gate 23 at the same time, but at slightly different azimuth, and hence the computed may not necessarily assign slots in order to each member of one flight. However, because of the spacing, no conflicting paths can occur. For purposes of illustration, it is assumed that the computer assigns slots alternately to members of the second and third flights 30 and 31, assigning slots F through M. Finally, members of the fourth flight 32 are assigned slots N through Q. The aircraft are now arranged on the approach at 30-second intervals except for one-minute intervals between aircrafts 4' and 5' and aircrafts 13' and 14'. These one-minute intervals correspond to the emergency slots $E_1$ and $E_2$ which are kept open. The aircraft proceed to the stack 21 at which point they dovetail with their assigned slot positions, and the flight continues in the stack around the port side of the carrier and to the landing gate and finally into the landing leg as shown in Fig. 1. It should be noted that the aircraft do not actually occupy a large portion of the stack to the starboard of the carrier for this arrangement of approach, direction and carrier heading. It should also be noticed that the lead aircraft 1' of the formation 28 flies the most direct route position to the carrier 22. In addition, this lead aircraft 1' will always receive the earliest assignment, assuming the stack to be empty, calling for the maximum approach speed, and it is thus obvious that the lead aircarft is landed in the best possible time. Other members of the formation 28 occupy progressive 30-second intervals behind the lead aircraft (except for the two emergency intervals) and it follows that the complete squadron is landed with no loss of time due to the standard breakup procedure or any other cause.

The stack assignments and command information supplied to the aircraft is determined on board the carrier 22 by means of a synchronized stack computer. It should again be pointed out that the communication equipment used in conjunction with the system of this invention permits an aircraft to continually report its position to the carrier. This reported information may be displayed on an information panel 36 associated with the computer, a portion of which is shown in Fig. 8. Each vertical column displays all information associated with a single aircraft. As each aircraft is identified its identification number is displayed in a window 37 and the vertical column is then assigned to that particular aircraft. The three meters 38, 39 and 40 display the aircraft's reported azimuth, distance and altitude respectively. From this information, a computer assigned to each aircraft, assigns a slot position in the stack and causes the telemetering of command signals to the aircraft to be initiated so that the aircraft flies the prescribed course. As hereinafter described the computer for each aircraft may be part of the azimuth indicator 38 and may therefore be contained on the information panel 36.

Below the information panel 36 is a monitor board 41 which comprises a row of lights 42—46 defining the approximate position and state of the aircraft relative to the landing pattern. The monitor board 41 allows the total situation to be evaluated quickly without deciphering the accurate indications of the meters 38—40. When light 42 is on it indicates that the aircraft assigned to that vertical column is within the 50-mile approach gate 23 and is therefore under control of the commuter. When an aircraft is under control of the computer a slot in the stack pattern 21 is assigned which would determine the landing order of the various aircraft. The landing order is displayed in window 47 at the bottom of the column. If desired the slot assignment A through S may be displayed in place of or in addition to the landing order.

When the aircraft reaches the stack 21, 3.2 nautical miles from carrier 22, light 43 is lit indicating that the aircraft is orbiting about the ship in its assigned slot.

Light 44 is turned on when the aircraft reaches the landing gate 27 and is on the final landing leg. In case it is necessary to prevent the landing of an aircraft for any reason a manual wave-off switch 48 is provided so that a particular aircraft or slot may be cleared from the traffic pattern at any time by the operator. If an aircraft is waved-off for any reason, either manually or automatically light 45 is turned on. Finally an alarm light 46 is associated with each aircraft denoting that the aircraft is not responding to the computer signals. This alarm information is derived in the apparatus by a continuous comparison of the reported positions of the aircraft with the commanded position determined by the computer. The alarm light 46 may also control an automatic wave-off.

The monitor board 41 may be remoted to other parts of the carrier 22 such as on deck or to a control center. If remoted the monitor board 41 must include aircraft identification means such as shown by window 37 of the information panel 36.

Associated with the information panel 36 and the monitor board 41 is an emergency board 49 a portion of which is shown in elevation in Fig. 9. Each vertical column of the emergency board 49 is devoted to a single slot position of the landing stack 21. As each slot position A through S is assigned to an aircraft by the computer the top light 50 in the slot column is switched on and signifies that the slot is reserved for the particular aircraft whose identification number is displayed in window 51. In the vertical columns assigned to the emergency slot positions $E_1$ and $E_2$ the emergency board contains the control button 52 for manually releasing the emergency slots so that they will accept the aircraft in trouble. A "stack stop" control button 53 is provided for the initiation of a stack stop for purposes hereinafter described. Each vertical column also provides an "advance" button 54 which could be used instead of a wave-off to clear any particular slot. Advancing a slot backs up all computers behind the selected slot by one position thus clearing the selected slot.

Before giving a more detailed description of the computer and its operation it is advisable to explain the action of aircraft's instruments and controls when cooperating with the traffic control system of this invention. It is assumed that the aircraft has completed its mission and a homing course was taken and the autopilot engaged. When within ranges of the carrier the aircraft either requests permisssion or is commanded to land. Fig. 10A is an illustration of the aircraft's instrument panel as it reaches the 50-mile approach gate 23. It should be clearly understood that the illustrations of an aircraft's instrument panel as it reaches the 50-mile approach gate 23. It should be clearly understood that the illustrations of an aircraft's instrument panel are for purposes of explanation only and no attempt is made to portray the optimum or actual instrumentation. At the 50-mile approach gate, landing control signals start being received and the autopilot or pilot is directed to follow them to arrive at his assigned stack position at the correct time, azimuth and altitude. The "bugs" or command indicators on the instruments begin to operate with their rates of movement being determined by the stack computer aboard the carrier and the information radioed to the aircraft via the communication equipment.

For purposes of illustration assume that aircraft 18 of Figure 6 has reached the approach gate 23. Referring to the aircraft's instrument panel illustrated in Fig. 10A the air speed indicator 55 shows that the plane is travelling at 112.5 knots at an azimuth of 96° as shown by the bearing indicator 56. Since the plane is to fly an azimuth of 96° to reach its assigned slot the bearing bug 57 is located at the 96° bearing. Since the aircraft is flying at an azimuth of 96° and is commanded to fly at an azimuth of 96° the crosspointer indicator 58 shows no deflection from the required course. Should aircraft 18 vary from this azimuth as would be indicated by the azimuth needle 59, the aircraft is turned right or left as required. The deflection of the crosspointer indicator 58 and thus the right-left control for the autopilot, is determined by the interval between the bearing indicator needle 59 and the bearing command bug 57. The present elevation of aircraft 18 is indicated by the pointed 60 of the altimeter 61 and the altitude command bug 62 indicates the stack entry altitude of 2,583 feet. The rate of climb (or descent) shown on meter 63 is determined by the interval between the altitude pointer 60 and the altitude command bug 62 of meter 61 and is at some maximum prescribed rate.

The distance of aircraft 18 to the carrier 22 is shown by the pointer 64 of distance meter 65. Since it was determined, as heretofore explained, that aircraft 18 must proceed at a closure rate of 142.8 knots to arrive at its slot position 0 at the correct time, the distance command bug 66 starts to decrease at the 142.8 knot closure rate. The air speed indication displayed on meter 55 is determined by the interval between the distance command bug 66 and the distance pointer 64 on meter 65. Thus it is apparent that the interval between the pointers and command bugs of bearing meter 56, altimeter 61 and distance meter 65 control the movements of the aircraft to cause it to approach the stack on a predetermined course.

Figure 10B illustrates the instrument panel of aircraft 18 as it assumes its assigned slot position 0 in the synchronized stack 21. The air speed indicator 55a, crosspointer indicator 58a and rate of climb meter 63a are controlled as explained above. Shortly before reaching the predetermined 3.2 mile radius stack the distance indication is used to trigger the autopilot into a prescribed right turn designed to prevent overshooting as the stack is approached and to bring the plane into its assigned slot asymptotically. In addition, the speed is reduced from the assigned approach speed of 142.8 knots to the stack speed of 120 knots. Since the aircraft must now orbit about the carrier 22 in the stack 21 the bearing bug 57a of bearing meter 56a rotates in synchronism with the synchronized stack rate of 360° in 10 minutes. If the azimuth needle 59a lags the bug 57a, power is applied to speed up the aircraft and therefore catch up to the slot position. Conversely, speed is reduced if the needle 59a leads bug 57a. The distance command bug 66a of distance meter 65a remains constant at 3.2 miles which is the radius of the stack 21. Should the indicated distance from 3.2 miles the aircraft will bank right or left to correct the drift. The altitude command bug 62a of altimeter 61a moves at the rate of 500 feet a minute descent. It must be remembered that while the average speed will be 120 knots, in order to follow the 30 knot motion of the carrier it will be necessary for the aircraft to fly as fast as 150 knots or as slow as 90 knots when flying parallel to the course of the carrier.

Fig. 10C illustrates the aircraft's instrument panel as the aircraft 18 enters the landing gate 27 which is located at a point 20° port of the ship's stern the plane leaves the stack 21 and enters the landing leg 26. This action is triggered by shipborne computer when the correct azimuth indication, 290° in the illustrated example, is coexistent with the correct altitude, approximately 250 feet. At this point the aircraft executes a prescribed left turn such that its path becomes nearly tangent to the landing path along the carrier's course. Simultaneously the aircraft's receiving equipment is switched to the localizer and glide path signals. A timing mechanism is started such that if the localizer and glide path flag alarms do not disappear in a given time (15 seconds) an automatic wave-off results. Excluding this possibility the localizer and glide slope signals control the plane. In addition, from the localizer equipment, localizer heading information is being received which aids the autopilot in the asymptotic approach and acts as a monitor on the localizer course. The control of the autopilot by the localizer and glide slope is performed in the normal manner controlling the left-right motion and rate of descent respectively. The air speed meter 55b indicates a predetermined optimum approach speed. The deflections of the crosspointer indicator 58b are controlled by the localizer and glide slope paths. The rate of climb displayed on meter 63b is determined by the glide slope deflection and rate. The altimeter 61b is controlled by the glide slope signal as its bug 62b is inactivated.

After proceeding to the stern of the ship a cut signal, as hereinafter described, determines whether the altitude of the aircraft, particularly its heading, is within certain limits safe for landing. If not, a wave-off is initiated. The cut signal shuts down the power and the aircraft lands on deck and is arrested in the usual manner.

As heretofore explained, both a stack computer and a communication system are essential to the operation of the traffic control system of this invention. It is the function of the computer, once an aircraft has requested or been ordered to land, to define the aircraft's position in distance, azimuth and altitude as a function of time and relative to the stack configuration and to telemeter these coordinates to the aircraft via the communication equipment during the approach and stack procedures. Since these coordinates are being telemetered continuously as a function of time, it is obvious that information as to speed, rate of turn or bank, and rates of climb or descent are available. Each aircraft is assigned a single computer which goes into operation as determined by the aircraft's identification. The computers are operated in banks with the necessary mechanical and electrical connections between them and could be mounted as part of the information panel shown in Fig. 8.

Referring to Fig. 11A, a simplified schematic diagram in block form of a communication system 68, 69a for use in conjunction with the traffic control system 69 of this invention is shown. One embodiment of a communication system which may be utilized with the system of this invention is disclosed in copending patent application of Paul R. Adams and Robert I. Colin, Serial No. 386,574, filed October 16, 1953, for "Aircraft Radio Navigation System," now U. S. Patent No. 2,836,815, and assigned to the same assignee as this application.

Essentially the communication system comprises a mobile transmitter-receiver unit 68 which is located aboard the aircraft and a transmitter-receiver unit 69a forming a fixed station 69 located aboard the carrier or at any other traffic control center. The mobile unit equipment 68 transmits signals, preferably pulse coded, which are indicative of its identity and position coordinates including distance, azimuth and altitude as well as an alert or precursor signal to indicate that an aircraft is about to transmit. The fixed station transmitter 69a transmits signals from which the craft may determine its position as well as address signals to indicate to which plane the following command signals are intended. The radio communication link between the carrier and aircraft comprising the fixed station transmitter-receiver equipment 69a and the airborne transmitter receiver equipment 68 exchange all the necessary information for the proper operation of the traffic system.

Normally the fixed station 69 will be able to receive the signals transmitted by the aircraft before the aircraft reaches the 50 mile radius designated as the approach gate 23 but in any event the computer commences operation when an aircraft reaches the approach gate 23. However, provision is made so that aircraft may be permitted entry to this region even if they do not desire to land, such as when flying "cover" for the carrier in which case the computer portion must be prevented from operating. Hence a distinct precursor signal is used to "alert" the shipborne equipment 69. The alert signal is transmitted by the mobile equipment 68, prior to other signals, when the pilot requests or is commanded to land. The transmissions of the mobile unit 68 are detected in the receiver portion of equipment 69a and coupled to alert circuit 70. Circuit 70 decodes and recognizes the alert signal and causes a signal to be coupled to gate 71 thus opening gate 71 and permitting the signals following the alert signal to be coupled to the identification portion of the system.

In most situations, such as when used aboard an aircraft carrier, the traffic control system of this invention will be cooperating with two groups of aircraft. The first group of aircraft includes all those planes which are permanently assigned to the carrier and will use the traffic control system most often. Each of the planes in the first group can be permanently assigned to cooperate with a particular computer. Thus if plane 3000 permanently assigned to the aircraft carrier, transmits an alert signal followed by its encoded identification signal. The detected alert signal causes gate 71 to open and the identification signal is coupled to the identification circuits 72a, 72b, 72n, 72p and 72j. Identification circuit 72a recognizes the identification signal of plane 3000 and causes gate 73a to open. The other identification circuits 72b, 72n, 72p and 72j fail to recognize the identification signal of plane 3000 and thus no signals are coupled to gates 73b or 73n, or finder circuit 74p or 74j.

The identification signals passed by circuit 72a are coupled via line 75a to computer 75a which is assigned to plane 3000 and are displayed on a plane identification 37 shown in Fig. 8. Simultaneously gate 73a permits the position report signals, which follow the identification signals, to be coupled to computer 76a via line 77a.

As hereinafter explained the computer 76a determines the necessary command signals to cause plane 3000 to fly a selected flight path. The command signals from the computer 76a assigned to plane 3000 are coupled via line 78a to a modulator 79 whose output is encoded and transmitted by the shipborne transmitter-receiver equipment 69a. Of course provision may be made for transmitting address signals from each computer, in any event it is necessary for each plane to know which command signals are intended for it.

The second group of planes, with which the traffic control system of this invention must cooperate, may be termed visiting planes. Obviously each plane must be assigned a computer which will command the plane to fly paths within its capabilities. All aircraft may be classified into typical types according to its characteristics. A visiting plane requesting permission or commanded to land will transmit an alert signal which is detected in circuit 70 whose output opens gate 71. The address of the visiting craft will contain signals indicative of its type and these signals will be identified by an identification circuit such as 72p or 72j. When identification circuit 72p recognizes an address as coming from a plane of type "P" the signals are passed to a finder circuit 74p whose function it is to "hunt" or "find" a computer which can cooperate with a plane of type "P" that is not presently assigned to another aircraft. When an "empty" computer is found by circuit 74p the identification signals are coupled to an identification circuit 72p' which decodes the signals and couples them to the computer 76p via line 75p. Simultaneously the circuit 72p' causes gate 73p to open coupling the position report signals, which follow the identification signals, to the computer 76p whose output is coupled to modulator 79 in a manner similar to the output of computer 76a.

It is obvious that each aircraft utilizing the traffic control system of this invention will be assigned a computer which is designed in accordance with the flight characteristics of the particular plane. However it is possible that the stack configurations heretofore described will not be suitable for all types of planes. For example assume that a flight of jet propelled aircraft request permission to land. It is possible that jet aircraft could not fly slow enough to maintain their assigned slot position. Referring to Fig. 110 an alternate stack configuration is therein shown which is suitable for use by at least two types of aircraft having widely varying flight characteristics. The stack pattern comprises two helices having different radii. The type of aircraft having the capability of flying at high speeds are assigned to the outer helix while the slower aircraft are assigned to the inner helix. The landing rate of planes can be maintained at a predetermined interval and the exact distance of the radius of the outer or inner helix can be determined from the flight characteristic of the aircraft type.

Referring to Fig. 11B a schematic diagram in block form of one embodiment of this invention is therein shown. As the identification circuit 72a recognizes the assigned plane 3000 identification signals they are passed to plane display 37 via line 75a. The signal is also passed to trip mechanism 80. The output of the trip mechanism 80 puts the stack assignment mechanism 81 into operation whose function it is to search for an empty slot position in the stack 21 and upon finding one assign it to the aircraft associated with the computer.

The distance, azimuth and altitude indicators 74, 75 and 76 shown in Fig. 11B may be the same instruments as are mounted on the information panel shown in Fig. 8. The position report signals passed by gate 73a are coupled to the position distance decoder 82a, position azimuth decoder 82b and position altitude decoder 82c. The output of the decoder circuits 82a, 82b and 82c, position the actual position indicators 77, 78 and 79 on meters 74, 75 and 76 and thus the actual position of the reporting aircraft is available in the computer. The actual position information is also coupled from decoder circuits 82a, 82b and 82c to the stack assignment mechanism 81.

As hereinafter explained, knowing the aircraft's azimuth, and the position of the assigned slot, the stack assignment mechanism 81 then sets the time function for distance, azimuth and altitude for the aircraft to follow in order for it to become synchronized into the stack. When the actual distance of the aircraft is 50 miles from the carrier, needle 77 of distance meter 74 makes contact with the 50-mile approach gate trigger 83 which couples a signal to the switching circuits 84 which then allows the telemetered command signals to be passed to the modulator 79 and equipment 69 for transmission to the aircraft. The command signals from switching circuits 84 are also coupled to the command distance decoder 85a, command azimuth decoder 85b and command altitude decoder 85c whose output control the positioning of the command position indicators 86a, 86b and 86c on meters 74, 75 and 76 respectively. Thus both command and actual position indications are available at meters 74, 75 and 76.

Remembering the stack procedure hereinbefore described, the time functions for the necessary command signals are derived as follows:

(1) The distance function is derived from the angular interval between the aircraft's azimuth and the assigned slot at the time of assignment;

(2) The azimuth function consists of holding the azimuth at the time of assignment throughout the approach phase; and (3) The altitude functions consist of correcting to the entry altitude which is determined from the aircraft's azimuth.

The distance function circuit 87 is driven through a variable speed device 88 and defines the desired position of the aircraft with respect to time from the approach gate 23 to the stack 21 at 3.2 miles from the carrier. Once the assigned slot position in the stack is determined, the computer sets the variable speed device 88 such that the plane must traverse the approach distance in the required time. The distance function circuit 87 then stops at 3.2 miles, forcing the plane to orbit at the stack radius. The command signals for the coordinates of the aircraft are determined by the approach azimuth function circuit 89 and the approach altitude function circuit 90 as well as the distance function circuit 87. The outputs of circuits 89, 90 and 87 are coupled through switching circuits 84 to modulator 79 to modulate the transmitter portion of equipment 69.

The aircraft is allowed to approach the stack under the above conditions until just prior to reaching the stack radius distance of 3.2 miles the actual distance needle 77 makes contact with the pre-stack trigger 91 causing a signal to be coupled to the stack entry bank signal circuit 92. The output of circuit 92 causes the plane to maneuver in a manner heretofore described just prior to its entry into the stack.

As the plane arrives at the stack radius distance of 3.2 miles needle 77 contacts the stack trigger 93 and a new set of functions are telemetered to the aircraft:

(1) The distance function holds the aircraft at the radius of the stack;

(2) The azimuth function holds the aircraft in its assigned slot position; and (3) The altitude function defines a 500 foot-per-minute descent for the aircraft.

The stack azimuth function circuit 94 and the stack altitude function circuit 95 defines the coordinates for the aircraft while in the stack 21 and up to the landing gate 27. The signal from the stack trigger 93 is utilized to switch the output of switching circuits 84 from the approach function circuits to the stack function circuits.

For monitoring purposes, the differential between the actual position pointers 77, 78 and 79 and needles 86a, 86b and 86c indicating the commanded position of the aircraft are continuously measured and if the interval exceeds a predetermined limit, indicating that the aircraft is not responding to the command signals, an alarm is given and an automatic wave-off is initiated.

The landing gate 27, as described previously, is a point from which the aircraft leave the stack 21 and begin the landing leg 26. The landing gate 27 is not fixed in space, hence it must be referred to the carrier. This information is obtained from the ship's gyrocompass heading 96 which positions the landing gate azimuth trigger 97. Although the aircraft azimuth position needle 78 may contact trigger 97 more than once, the aircraft must also be at a predetermined altitude as determined by altitude position needle 79 contacting the landing gate altitude trigger 97a before a signal is coupled to the stack release signal circuit 98 the output of which clears the stack assignment mechanism 81 and may also switch the aircraft receiver to the landing system signals.

Figure 14:
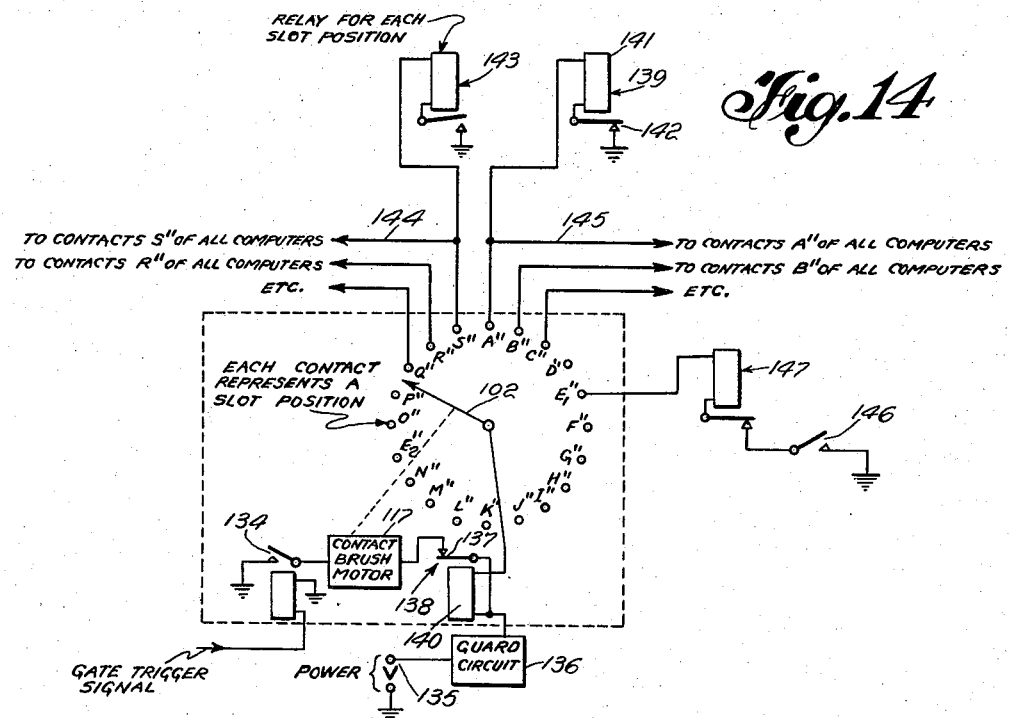
Fig. 14 is a schematic diagram of a detail of the slot assignment mechanism shown in Fig. 12.

Referring to Figs. 12, 13 and 14 an embodiment of portions of the computer including the stack assignment mechanism 81 for use in the traffic control system of this invention is shown. The mechanism of the drawings can be an integral part of the azimuth indicator 38 and can therefore be contained in the information panel shown in Fig. 8. It is assumed for purposes of explanation that the position coordinates are defined by potentiometers. One stack assignment mechanism 81 is associated with each computer and therefore with an individual aircraft. In addition to the azimuth indicating needle 99, the unit contains on its face 100 a ring 101 of twenty slot defining contacts A through S, one for each slot position in the stack 21, and a contact brush 102. The ring 101 and hence the slot defining contacts A through S are rotated at the stack speed of one revolution per minute by a master stack motor drive shaft 103. The shaft 103 drives all computers from a common power source thereby insuring that all computers remain in synchronism. The slot contacts A through S are coupled to contacts $a_1$ through $s_1$ in a stationary terminal board 104 through slip rings $a_2$ through $s_2$ mounted on armature 105. The slip rings are coupled to the terminal board 104 by means of brushes 106.

At all times while the aircraft is in the air and within range of the carrier equipment, the azimuth servo 113 is positioning the azimuth indicator 99 in accordance with the telemetered azimuth report of the plane's position. The azimuth servo 113 controls meter 38 by coupling its output through shaft 114 via gears 115 to shaft 116 on which the azimuth indicator needle 99 is mounted. During this period and when the airplane alert signal is coupled to the computer, clutches 107, 109 and 110 are engaged, the other clutches 108, 111 and 112 being disengaged. Since clutch 107 is engaged the azimuth servo 113 drives the contact brush motor 117 through gears 118a and 118b of gear train 118. The contact brush motor 117 drives the contact brush 102 through shaft 119 via gears 120 to shaft 121 on which the contact brush 102 is mounted. This causes the contact brush 102 to maintain alignment with the indicator needle 99 of azimuth meter 38. Since clutches 110 and 109 are also engaged the stack azimuth potentiometer 122 and the approach azimuth potentiometer 123 are both driven by the azimuth servo 113 and therefore are kept in track. In addition the stack altitude potentiometer 124 is tracking the stack azimuth potentiometer 122 and the approach altitude potentiometer 125 is always defining the entry altitude for the indicated azimuth.

As the aircraft enters the 50-mile approach gate 23, the trigger signal, hereinbefore explained, causes clutches 110 and 112 to engage and all the other clutches 107, 108, 109 and 111 will be disengaged. It is at this time that the stack slot assignment is made. The disengaging of clutch 109 leaves the approach azimuth potentiometer 123 defining the azimuth of the aircraft as it enters the approach gate 23 and the approach altitude potentiometer 125 is defining the stack entry altitude for that azimuth. At this time the contact brush motor 117 starts to run, driving the contact brush 102 clockwise away from the indicated azimuth and around the slot defining contacts A through S. The brush 102 will stop at the first slot that is not assigned, as hereinafter described. The rotation of the contact brush motor 117 also causes the stack azimuth potentiometer 122 and stack altitude potentiometer 124 to rotate by transmiting power through shaft 126 and gears 118a and 118b of gear train 118 and through clutch 110 which is engaged. Potentiometers 122 and 124 define the azimuth and altitude of the assigned slot at the moment when brush 102 makes the assignment. In addition, the motion of the brush motor 117 causes the ratio changing shaft 127 of the variable speed drive 128 to set the proper ratio between the drive input shaft 129 and the drive output shaft 130.

When the contact brush 102 locates an empty slot it triggers a new clutch arrangement such that clutches 108, 110 and 111 are engaged while clutches 107, 109 and 112 are disengaged. This clutch arrangement causes the master stack motor drive shaft 103 to drive the stack assignment mechanism through gears 131, shaft 132, clutch 108 and gear train 118. The distance potentiometer 133, having been preset at fifty miles, is then turned by power transmitted through the variable speed drive 128 and clutch 111 which is engaged so as to define the correct rate of closure for the aircraft to the stack. In addition the stack altitude potentiometer 124 and the stack azimuth potentiometer 122 are driven synchronously because clutch 110 is engaged and they continuously define the coordinates of the assigned slot position. All this time, it must be remembered, that the aircraft is being given telemetered command signals derived from the distance potentiometer 133 and from the approach altitude and azimuth potentiometers 125 and 123. During this clutch arrangement the contact brush 102 is driven synchronously with the ring 101 so that it will remain on and rotate with an associated slot defining contact, always permitting a usual check.

The above conditions remain fixed until the pre-stack trigger 91 shown on the distance meter 74 of Fig. 11B is reached by indicator needle 77. At this time a unique signal, the stack entry bank signal, is momentarily telemetered, putting the aircraft into a predetermined bank designed to prevent overshoot on entering the stack. Simultaneously the aircraft's speed is adjusted to the stack speed.

Seconds later the aircraft arrives at the 3.2 mile radius of the stack and at this point clutch 111 disengages leaving the distance potentiometer 133 fixed at 3.2 miles. Simultaneously the source of the telemetered command signals is switched from the approach azimuth and altitude potentiometers 123 and 125 to the stack azimuth and altitude potentiometers 122 and 124. If the aircraft has responded properly the two sets of potentiometers 123, 125 and 122, 124 will be defining the same coordinates at the time of switching and hence no discontinuity results. The stack potentiometers 122 and 124 are rotated synchronously from the time of slot assignment and now define to the aircraft the azimuthal position of the slot and the altitude at each constant of time, causing the aircraft to fly the helical path of the stack 23 with a rate of descent of 500 feet per minute.

The landing gate triggers 97 and 97a, placed on the periphery of the azimuth and altitude meters 75 and 76 shown in Fig. 11C is servo positioned from the ship's gyro heading such that it maintains a point 20° to port of the stern of the carrier. When the landing gate triggers 97 and 97a simultaneously make contact with position needles 78 and 79 a unique release signal is telemetered to the aircraft. The release signal causes the aircraft to bank into the landing leg 26 and automatically switches the aircraft receiver equipment to the landing system transmissions. At the same time the release signal clears and resets the computer and it indicates that the slot is no longer assigned.

Referring to Fig. 14, a schematic diagram of a detail of the slot assignment mechanism 81 is shown. Referring again to the time when the computer makes the slot assignment, that is when the aircraft enters the 50-mile approach gate 23 and a reservation is desired a switch 134 is closed by the approach gate trigger signal Voltage, from power source 135, is then applied through a guard circuit 136, hereinafter described, via switch 137 of relay 138, to the contact brush motor 117. The contact brush 102 then wipes around the contacts A″ through S″ until a short circuit is encountered, as is shown for slot contact A″, where the contact is shorted to ground through relay 139. Now current flows through the coil 140 of relay 138 and the coil 141 of relay 139. The current flow in coil 140 causes switch 137 to open, stopping the rotation of the contact brush 102 because the power to the brush motor 117 is removed. Simultaneously, the current in coil 141 causes the contacts of switch 142 to open which prevents any other contact brush in any other stack from being shorted to ground when it is coupled to slot contact A″ and therefore indicates that slot A″ is assigned. Relay 143 shows the position of the relay switch when the slot S″ has been assigned to an aircraft. It must be remembered that there is a relay 143 similar to relay 139 for each slot contact and all the relays for each slot are interconnected as indicated by lines 144 and 145.

Referring to emergency slot contacts $E_1''$ and $E_2''$ an additional switch 146 is added to the relay circuit 147. Relay 147 is similar to relays 139 and 143 and all other relays associated with the slot contacts A″ through S″. Switch 146 is normally opened, thereby preventing the contact brush 102 from coming to rest or assigning slot $E_1''$ and holding slot $E_1''$ of the stack in reverse. Slot $E_1''$ may be released to an aircraft in trouble by closing switch 146, either manually or automatically by some predetermined unique emergency signal, after which slot $E_1''$ can be assigned.

Figure 15:
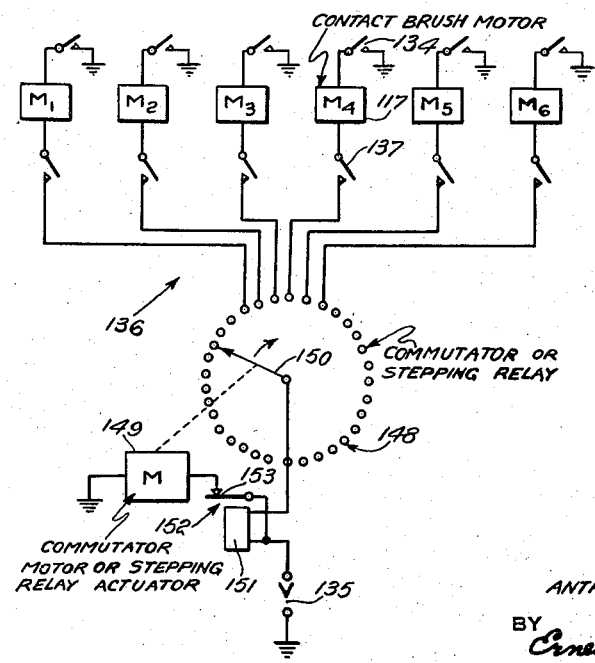
Fig. 15 is a schematic diagram of the guard circuit for use with the slot assignment mechanism of Fig. 12.

Referring to Fig. 15 a schematic diagram of the guard circuit 136 is shown which prevents two aircraft, when calling simultaneously, from being given the same slot assignment. A fast stepping relay or continuously rotating commutator 148 is utilized in conjunction with a stepping relay actuator or commutator motor 149 which rotates armature 150 around the contacts of 148. One contact of 148 is associated with each computer of the system. The contacts of 148 are each coupled through switch 137 to the contact brush motors 117 of each computer. Obviously if only one contact brush motor 117 is allowed to rotate at a time, the same slot assignments cannot be given to two airplanes which call in simultaneously. The 50-mile approach gate trigger signal causes switch 134 of the computer corresponding to the aircraft identification to close. When the commutator armature 150 comes around to the contact of 148 coupled to the operative brush motor 117 current flows in the coil 151 of relay 152 and power from source 135 is coupled to the motor 117 through switch 137. As current flows through coil 151 of relay 152 it causes the normally closed contacts of switch 153 to open decoupling the commutator motor 149 from the power source 135 and causing armature 150 to cease rotating. The armature 150 is halted in this position until the computer has found a reservation (as explained supra) at which time the brush motor switch 137 opens. When switch 137 opens brush motor 117 stops rotating and current ceases to flow in coil 151 of relay 152 closing switch 153. The armature 150 will then continue to rotate in search of another computer desiring to make a slot assignment to an aircraft.

In the event that it is necessary to establish a second landing stack configuration above the first stack the computer should be altered. If after once rotating around the slot defining contacts the brush 102 cannot find an empty slot, a second set of assignment relays, representing the upper stack, are switched in. The brush 102 then continues to rotate searching for an empty slot in the upper stack. In such a case it is also necessary to simultaneously switch altitude potentiometers defining the upper stack or make the potentiometers used cover the complete range. In this manner, perfect synchronism is obtained for both turns if the helical stack and smooth passage down the complete path is assured.

While I have described above the principles of my invention in connection with specific apparatus, it is to be clearly understood that this description is made only by way of example and not as a limitation to the scope of my invention as set forth in the objects thereof and in the accompanying claims.

I claim:

1. A traffic control system, having a base station for cooperating with a plurality of mobile units each of said mobile units including communication means for reporting its position coordinates to said base station, comprising a plurality of slot assignment mechanisms one assigned to each of said mobile units, means to control said mechanisms in synchronism to establish a predetermined traffic control pattern having a plurality of slot assignments each of said slots representing a location in space and having varying position coordinates, means to compare the position coordinates of one of said mobile units with the varying position coordinates of a slot assignment, means to determine necessary command signals for controlling movement of said one mobile unit to cause position coordinates of said mobile unit to coincide with said varying slot position coordinates at a predetermined time and means to communicate said command signals to said mobile unit.

2. A traffic control system according to claim 1 wherein said base station further includes interlocking means between said plurality of slot assigning mechanisms to prevent more than one of said mobile units being assigned the same slot assignment by more than one of said slot assignment mechanisms.

3. A traffic control system, for cooperation with a mobile craft having communication apparatus for reporting its position, for establishing the course said craft must follow to be integrated into a predetermined traffic pattern having a plurality of moving slot assignments each of said slots representing a location in space and having identifying slot position coordinates varying with said movement, comprising means for establishing said pattern of moving slot assignments including identifying position coordinates for each slot, means to assign one of said slot positions in said pattern to said craft, means to compare the position coordinates of said craft with the position coordinates of said slot and means to determine the path coordinates said craft must follow to cause said slot coordinates and said craft position coordinates to coincide at a predetermined time.

4. A traffic control system for a predetermined area for guiding mobile craft having communication apparatus for reporting its position coordinates to a base station having communication equipment for communicating to said craft command signals indicative of a course for said craft, comprising means at said station for establishing a traffic pattern having a plurality of moving slot assignments each of said slots representing a location in space and having slot position coordinates varying with said movement, means to assign one of said slot positions in said pattern to said craft when said mobile craft enters said predetermined area, means to compare the position coordinates of said craft with the position coordinates of said assigned slot and means to determine the path coordinates said craft must follow to cause said slot coordinates and said craft position coordinates to coincide at a predetermined time.

5. A traffic control system for a predetermined area for guiding craft having communication apparatus for reporting its position coordinates to a base station having communication equipment for communicating to said craft command signals indicative of a course for said craft comprising means at said station for establishing a traffic pattern having a plurality of moving slot assignments each of said slots representing a location in space and having slot position coordinates varying with said movement, means to assign one of said slot positions in said pattern to said craft when said mobile craft enters said predetermined area, means to compare the reported position coordinates of said craft with the position coordinates of said assigned slot, means to determine the path coordinates said craft must follow to cause said slot coordinates and said craft position coordinates to coincide at a predetermined time, means responsive to said coincidence of coordinates to cause said command signals communicated to said craft to be indicative of said varying slot assignment coordinates.

6. A traffic control system according to claim 5 wherein said means responsive to said coincidence of coordinates further includes means anticipating said coincidence to cause said craft to follow a course which gradually causes the position coordinates of said craft and said slot coordinates to become identical.

7. A flight path computer for determining the course of a craft, having radio communication apparatus for reporting its position, must follow to be integrated into a predetermined pattern having a plurality of moving slots each of said slots representing a location in space and having identifying slot position coordinates varying with said movement comprising means for establishing said pattern of moving slot assignments including identifying position coordinates for each slot, means to assign one of said slot positions in said pattern to said craft, means to compare said slot position coordinates with position of said craft, means responsive to said comparison to determine the time necessary for said slot position to assume the reported azimuth of said craft, means to determine the rate of change of the distance coordinate said craft must assume to cause said craft to intercept said slot after the elapse of said determined time, means to determine the altitude coordinate of said slot when intercepted by said craft after the elapse of said determined time, means to determine the rate of change of altitude coordinate said craft must assume to cause said craft to intercept said slot after the elapse of said determined time, means to determine the azimuth coordinate said craft must follow to intercept said slot after the elapse of said determined time and means to communicate said coordinates to said craft.

8. A flight path computer for determining the course of a craft, having radio communication apparatus for reporting its position, must follow to be integrated into a predetermined pattern having a plurality of moving slots each of said slots representing a location in space and having identifying slot position coordinates varying with said movement comprising means for establishing said pattern of moving slot assignments including identifying position coordinates for each slot, means to assign one of said slot positions in said path to said craft, means to determine the time necessary for said slot position to assume the reported azimuth of said craft, means to establish signals indicative of rate of change of distance, means to select one of said rate of change of distance signals responsive to the reported distance of said craft and said determined time, means to establish signals indicative of azimuth, means to select one of said azimuth's signals responsive to the reported azimuth of said craft and the azimuth said assigned slot assumes after the elapse of said determined time, means to establish signals indicative of altitude, means to select one of said altitude signals responsive to the altitude of said assigned slot after the elapse of said determined time and means to communicate said selected rate of change of distance, azimuth and altitude signals to said craft.

9. A computer for determining the course a craft, having radio communication apparatus for reporting its position coordinates, must follow to be integrated in a predetermined moving traffic pattern having a plurality of positions, each of said positions having identifying position coordinates varying with said movement, comprising means for establishing said pattern of moving slot assignments including identifying position coordinates for each slot, means to assign one of said positions in said pattern to said craft, means to compare the reported position coordinates of said craft with the coordinates of said assigned position, means to determine the necessary command signals for controlling movement of said craft to cause said craft's position coordinates to correspond to said assigned position coordinates and means to communicate said command signals to said crraft.

10. A landing path computer for determining the course craft, having radio communication apparatus for reporting their position, must follow to be integrated into a predetermined landing pattern having a plurality of moving slots each of said slots representing a location in space and having identifying slot coordinates varying with said movement forming a stack pattern comprising a plurality of stack assignment mechanisms to establish said pattern, means to assign one of said plurality of stack assignment mechanisms to each of said craft, each of said stack assignment mechanisms having means to assign an individual slot position to its assigned craft, dependent upon the reported position of said craft, means to communicate to said craft the varying slot coordinates of its assigned slot and means aboard said craft responsive to said communicated coordinates to cause said craft to assume a position wherein the coordinates of said craft equal the coordinates of said slot.

11. A landing path computer for determining the course craft, having radio communication apparatus for reporting their position, must follow to be integrated into a predetermined landing pattern having a plurality of moving slots each of said slots representing a location in space and having identifying slot coordinates varying with said movement forming a stack pattern comprising a plurality of slot assigned mechanisms one for each of said mobile units, means to control said mechanisms in synchronism to establish said landing pattern having a plurality of slot assignments each having varying position coordinates, means to assign one of said slots to said craft, means to communicate to said craft the distance, altitude and azimuth coordinates of said slot, means aboard said craft to cause said craft to move to the position of said communicated coordinates, means responsive to the coincidence of said slot coordinates and the reported position of said craft to cause said altitude coordinate to vary by a given rate of descent and said azimuth coordinate to vary as a function of time and to maintain said distance coordinate constant and means to communicate said coordinates to said craft.

12. A landing path computer for determining the course craft, having radio communication apparatus for reporting their position, must follow to be integrated into a landing stack pattern having a plurality of slots each of said slots representing a location in space and having identifying slot coordinates comprising a plurality of stack assignment mechanisms, means to control said stack assignment mechanisms in synchronism, means to assign one of said plurality of stack assignment mechanisms to each of said craft, each of said stack assignment mechanisms having means to assign an individual slot position to its assigned craft, means to communicate to said craft the distance, azimuth and altitude coordinates of its assigned slot, means to vary said altitude coordinate of said slot by a given rate of descent, means to vary said azimuth coordinate of said slot as a function of time and means to maintain said distance coordinate of said slot constant.

13. A computer for determining the course a mobile craft, having radio communication apparatus for reporting its position coordinates, must follow to approach and be oriented in a predetermined moving traffic pattern having a plurality of slot positions each of said slots representing a location in space and having identifying slot position coordinates varying with said movement, comprising means for establishing said pattern of moving slot assignments including identifying position coordinates for each slot, means to assign one of said slot positions in said pattern to said mobile craft, means to determine the time necessary for said slot position to assume the reported azimuth of said craft, means to determine the rate of change of the distance coordinate said craft must assume to cause said craft to intercept said slot after the elapse of said determined time, means to determine the altitude coordinate of said slot when intercepted by said craft after the elapse of said determined time, means to determine the rate of change of altitude coordinate said craft must assume to cause said craft to intercept said slot after the elapse of said determined time, means to determine the azimuth coordinate said craft must follow to intercept said slot after the elapse of said determined time, means to communicate said determined coordinates to said craft, means to compare the reported position coordinates of said craft with the coordinates of said assigned slot, means to determine necessary command signal for controlling movement of said one mobile craft to cause the position coordinates thereof to correspond to said assigned slot's varying coordinates and means to communicate said command signals to said craft.

14. A traffic control system, having a base station for cooperating with a plurality of mobile units each of said mobile units including communication means for reporting its position coordinates to said base station, comprising a plurality of slot assignment mechanisms, means to control said mechanisms in synchronism to establish a predetermined traffic control pattern having a plurality of slot assignments, each of said slots representing a location in space and having varying position coordinates, means to assign one of said slot assignment mechanisms to each of said mobile units, means to compare the position coordinates of one of said mobile units with the varying position coordinates of its slot assignment, means to determine necessary command signals for controlling movement of said one unit to cause unit position coordinates thereof to coincide with said varying slot position coordinates at a predetermined time and means to communicate said command signals to said mobile unit.

15. A traffic control system according to claim 14 wherein each of said mobile units includes means for communicating to said base station signals indicative of its identity and said means to assign said slot assignment mechanism is controlled by the identity of said mobile unit.

References Cited in the file of this patent

UNITED STATES PATENTS

| | | |
|---|---|---|
| 2,344,761 | Wight et al. | Mar. 21, 1944 |
| 2,468,045 | Deloraine | Apr. 26, 1949 |
| 2,475,221 | Coley | July 5, 1949 |